(12) United States Patent
Lee et al.

(10) Patent No.: US 9,466,828 B2
(45) Date of Patent: Oct. 11, 2016

(54) METHOD FOR PREPARING ELECTRODE ACTIVE MATERIAL FOR RECHARGEABLE LITHIUM BATTERY, ELECTRODE ACTIVE MATERIAL FOR RECHARGEABLE LITHIUM BATTERY, AND RECHARGEABLE LITHIUM BATTERY

(71) Applicant: POSCO CHEMTECH CO., LTD., Pohang-si (KR)

(72) Inventors: Mi Ryeong Lee, Sejong (KR); Heon Young Lee, Cheonan-si (KR); Kyoung Muk Lee, Sejong (KR)

(73) Assignee: POSCO CHEMTECH CO., LTD., Pohang-Si (KR)

( * ) Notice: Subject to any disclaimer, the term of this patent is extended or adjusted under 35 U.S.C. 154(b) by 213 days.

(21) Appl. No.: 14/065,652

(22) Filed: Oct. 29, 2013

(65) Prior Publication Data
US 2015/0017525 A1   Jan. 15, 2015

(30) Foreign Application Priority Data
Jul. 15, 2013 (KR) .................. 10-2013-0083007

(51) Int. Cl.
| | |
|---|---|
| *H01M 4/1393* | (2010.01) |
| *H01M 4/36* | (2006.01) |
| *H01M 4/62* | (2006.01) |
| *H01M 4/133* | (2010.01) |
| *H01M 4/04* | (2006.01) |

(Continued)

(52) U.S. Cl.
CPC ......... *H01M 4/1393* (2013.01); *H01M 4/0471* (2013.01); *H01M 4/133* (2013.01); *H01M 4/366* (2013.01); *H01M 4/62* (2013.01); *H01M 4/587* (2013.01); *H01M 10/0525* (2013.01); *Y02E 60/122* (2013.01); *Y02P 70/54* (2015.11)

(58) Field of Classification Search
CPC .... H01M 4/1393; H01M 4/366; H01M 4/62; H01M 4/133; H01M 4/0471; H01M 10/0525
See application file for complete search history.

(56) References Cited

U.S. PATENT DOCUMENTS

| | | | |
|---|---|---|---|
| 2001/0051300 A1* | 12/2001 | Moriguchi et al. ........ | 429/231.8 |
| 2002/0134964 A1* | 9/2002 | Christian ............... | B82Y 30/00 |
| | | | 252/182.1 |

FOREIGN PATENT DOCUMENTS

| | | |
|---|---|---|
| KR | 10-2004-0100058 | 12/2004 |
| KR | 10-2005-0095956 | 10/2005 |

(Continued)

OTHER PUBLICATIONS

Lee, Mi Ryeong et al., "An anode active material on which a ceramic is uniformly coated" Published on Dec. 11, 2012, by POSCO Chemtech.

(Continued)

*Primary Examiner* — Helen O Conley
(74) *Attorney, Agent, or Firm* — Lex IP Meister, PLLC

(57) ABSTRACT

Disclosed is a method for preparing an electrode active material for a rechargeable lithium battery, including: performing first mixing to mix a carbon-based active material with a low crystalline carbon material; performing second mixing to mix the mixture of the carbon-based active material and the low crystalline carbon material with a ceramic; and performing a heat treatment, an electrode for a rechargeable lithium battery including the electrode active material for the rechargeable lithium battery prepared by the method, and a rechargeable lithium battery.

21 Claims, 5 Drawing Sheets

(51) Int. Cl.
*H01M 4/587* (2010.01)
*H01M 10/0525* (2010.01)

(56) References Cited

FOREIGN PATENT DOCUMENTS

| KR | 10-2006-0087003 | 8/2006 |
|---|---|---|
| KR | 10-2007-0034224 | 3/2007 |
| KR | 10-2010-0121874 | 11/2010 |
| KR | 10-2011-0123095 | 11/2011 |
| KR | 10-2011-0100497 | 12/2011 |
| KR | 10-2012-0070494 | 6/2012 |
| KR | 10-2012-0070495 | 6/2012 |
| KR | 10-2012-0114561 | 10/2012 |

OTHER PUBLICATIONS

J. Gao et al., "Improving electrochemical performance of graphitic carbon in pc-$TiO_2$ coating" Electrochimica Acta 53, p. 2376-2379 (Oct. 7, 2007).

George Ting-Kuo Fey et al., "$TiO_2$ coating for long-cycling $LiCoO_2$: A comparison of coating procedures" Surface & Coatings Technology 199, p. 22-31 (May 12, 2005).

Yang Yong et al., "Effect of modification on performance of natural graphite coated by $SiO_2$ for anode of lithium ion batteries" Trans. Nonferrous Met. Soc. China, vol. 17, Issue 6, p. 1339-1342 (Dec. 2007).

\* cited by examiner

METHOD FOR PREPARING ELECTRODE ACTIVE MATERIAL FOR RECHARGEABLE LITHIUM BATTERY, ELECTRODE ACTIVE MATERIAL FOR RECHARGEABLE LITHIUM BATTERY, AND RECHARGEABLE LITHIUM BATTERY

CROSS-REFERENCE TO RELATED APPLICATION

This application claims priority to and the benefit of Korean Patent Application No. 10-2013-0083007 filed in the Korean Intellectual Property Office on Jul. 15, 2013, the entire contents of which are incorporated herein by reference.

BACKGROUND OF THE INVENTION (a) Field of the Invention

The following disclosure relates to a method for preparing an electrode active material for a rechargeable lithium battery, an electrode active material for a rechargeable lithium battery, and a rechargeable lithium battery.

(b) Description of the Related Art

A rechargeable lithium battery has recently become prominent as a power supply for portable small electronic devices. The rechargeable lithium battery has a discharge voltage of two times higher than an existing battery using an aqueous alkaline solution by using an organic electrolyte solution. As a result, the rechargeable lithium battery provides higher energy density than the existing battery.

As a cathode active material for the rechargeable lithium battery, an oxide formed of lithium having a structure in which intercalation of lithium ions is possible, such as $LiCoO_2$, $LiMn_2O_4$, $LiNi_{1-x}Co_xO_2$ (0<x<1), or the like and a transition metal is mainly used.

As an anode active material for the rechargeable lithium battery, various types of carbon materials including artificial graphite, natural graphite, soft carbon, and hard carbon are mainly used. As the anode active material for the rechargeable lithium battery according to the related art, a crystalline-based carbon material such as artificial graphite or natural graphite in which intercalation/deintercalation of lithium ions is possible has been mainly used. In the case of the carbon material, a competitive cost and an initial discharge capacity are excellent. However, the rechargeable lithium battery market has been expanded to ESS or the field of electric vehicles, such that the development of a high-stability anode active material to be available at a low temperature has been demanded. As one of methods for solving it, a study on an anode material with ceramic coating has been conducted.

Generally, the ceramic coating is formed by a wet method, and it has been confirmed that high reversible capacity and cycle characteristics are improved by coating silica on a surface of the natural graphite through a hydrolysis method of tetraethyl orthosilicate (TEOS) using a sol-gel process (Trans. Nonferrous Met. Soc. China 17 (2007) 1339).

Furthermore, describing Patent Documents (Application Nos. 10-2009-0051627 and 10-2009-0045873) in which the ceramic coating is formed by a dry method, it may be confirmed that thermal stability and efficiency according to the charge and discharge and cycle life characteristics of the battery are improved. However, with the ceramic coating method, the surface is not uniformly coated and the ceramic is partially coagulated.

Therefore, according to the demand of the rechargeable lithium battery market, a simple process capable of mass-production of the ceramic coating active material for a middle and large-sized battery and the development of a uniform ceramic coating technology capable of reducing deviation between the ceramic coagulation and the active material have been demanded.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for preparing an electrode active material for a rechargeable lithium battery capable of improving long-term reliability and resistance by suppressing a swelling phenomenon of a battery by preparing an anode active material on which a ceramic is uniformly coated, and a rechargeable lithium battery capable of having improved electrochemical and safety characteristics.

The present invention also provides an electrode active material prepared by a method for preparing an electrode active material for a rechargeable lithium battery, an electrode, and a rechargeable lithium battery.

An exemplary embodiment of the present invention provides a method for preparing an electrode active material for a rechargeable lithium battery, the method including: performing first mixing to mix a carbon-based active material with a low crystalline carbon material; performing second mixing to mix the mixture of the carbon-based active material and the low crystalline carbon material with a ceramic; and performing a heat treatment.

The heat treatment may be performed after the first mixing.

The heat treatment may be performed after the second mixing.

The heat treatment may include a first heat treatment after the first mixing and a second heat treatment after the second mixing.

The carbon-based active material may be natural graphite, artificial graphite, soft carbon, hard carbon, or a combination thereof.

The low crystalline carbon material may be a petroleum-based pitch, a coal-based pitch, a mesophase pitch, a low molecular heavy oil, polyvinyl alcohol (PVA), polyvinyl chloride (PVC), sucrose, a phenol resin, a furan resin, furfuryl alcohol, polyacrylonitrile, cellulose, styrene, a polyimide, an epoxy resin, glucose, or a combination thereof.

The ceramic may be an oxide generated from a metal oxide, a non-metal oxide, a composite metal oxide, a rare-earth oxide, a metal halide, a ceramic precursor, or a combination thereof.

The ceramic precursor may be zirconia, aluminum, polycarbosilane, polysiloxane, polysilazane, or a combination thereof.

The ceramic may be $SiO_2$, $Al_2O_3$, $Li_4Ti_5O_{12}$, $TiO_2$, $CeO_2$, $ZrO_2$, $BaTiO_3$, $Y_2O_3$, MgO, CuO, ZnO, $AlPO_4$, AlF, $Si_3N_4$, AlN, TiN, WC, SiC, TiC, $MoSi_2$, $Fe_2O_3$, $GeO_2$, $Li_2O$, MnO, NiO, zeolite, or a combination thereof.

An average particle size of the carbon-based active material may be 1 to 30 μm.

An average particle size of the ceramic may be 10 to 1000 nm.

A content of the low crystalline carbon material may be 0.1 to 50 parts by weight based on 100 parts by weight of the carbon-based active material.

A content of the ceramic may be 0.1 to 10 parts by weight based on 100 parts by weight of the mixture of the carbon-based active material and the low crystalline carbon material.

The first mixing and the second mixing may be performed by a mechanical mixing method.

The mechanical mixing method may be performed by any one of ball milling, mechanofusion milling, shaker milling, planetary milling, attritor milling, disk milling, shape milling, nauta milling, nobilta milling, high speed mixing, or a combination thereof.

The first mixing may be performed between 500 and 2500 rpm.

The second mixing may be performed between 800 and 10,000 rpm.

The heat treatment may be performed under an atmosphere of hydrogen, nitrogen, argon, or a mixture thereof.

The heat treatment may be performed at a temperature of 250 to 1500° C.

The first heat treatment may be performed at a temperature of 250 to 1500° C.

The second heat treatment may be performed at a temperature of 600 to 3000° C.

Another exemplary embodiment of the present invention provides an electrode active material for a rechargeable lithium battery prepared by the method.

Yet another exemplary embodiment of the present invention provides a rechargeable lithium battery including an electrode including the above-mentioned electrode active material and an electrolyte.

Specific matters of other exemplary embodiments of the present invention will be included in the detailed description.

According to the exemplary embodiment of the present invention, a method for preparing an electrode active material for a rechargeable lithium battery can improve long-term reliability and resistance by suppressing a swelling phenomenon of a battery by preparing an anode active material on which a ceramic is uniformly coated, and a rechargeable lithium battery in which electrochemical and safety characteristics are improved can be implemented.

DETAILED DESCRIPTION OF THE EMBODIMENTS

Figure 1:
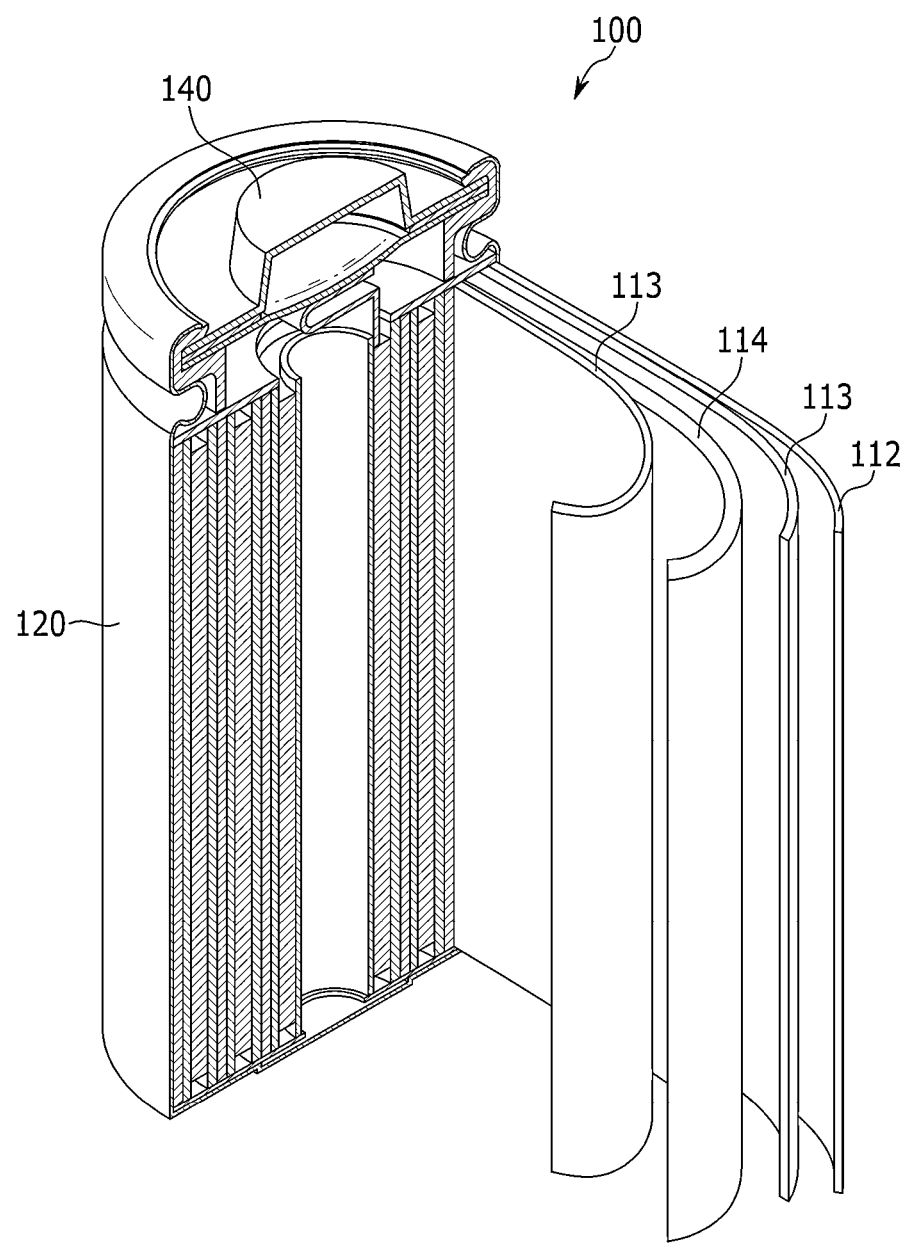
FIG. 1 is an exploded perspective view of a rechargeable lithium battery according to an exemplary embodiment of the present invention.

Hereinafter, embodiments of the present invention will be described in detail. However, the embodiments are described for illustrative purpose, and the present invention is not limited thereto. Therefore, the present invention will be defined by the scope of the appended claims to be described below.

A method for preparing an electrode active material for a rechargeable lithium battery according to an exemplary embodiment of the present invention includes performing first mixing to mix a carbon-based active material with a low crystalline carbon material, performing second mixing to mix the mixture of the carbon-based active material and the low crystalline carbon material with ceramic, and performing a heat treatment.

Generally, as the anode active material for the rechargeable lithium battery, a crystalline-based carbon material such as artificial graphite or natural graphite in which intercalation/deintercalation of lithium ions is possible has been mainly used.

In detail, since graphite has a discharge voltage of 0.2 V, it has a lower discharge voltage than lithium, and in the case in which the graphite is used as the active material, the rechargeable lithium battery has a high discharge voltage of 3.6 V, thereby providing the merit in terms of energy density. In addition, the graphite has excellent reversibility to thereby improve cycle life of the rechargeable lithium battery. Thus, the graphite has been widely used.

In this case, since the natural graphite has a low cost and has a similar electrochemical characteristic to artificial graphite, its effectiveness as the anode active material is high.

The natural graphite may be used by converting it to have a smooth surface shape through a post-treatment process such as a spheronisation process or the like in order to reduce the non-reversible reaction and improve the processability of the electrode. However, during the post-treatment process such as the spheronisation process or the like, when a defect occurs in the crystal structure of the natural graphite such that the edge surface is exposed to the electrolyte, a side reaction with the electrolyte may be generated at a portion at which the edge surface is exposed, such that the electrode structure is broken down.

In order to compensate for this problem, a method for preventing the edge surface of the graphite from being exposed has been used by coating the surface with a low crystalline carbon material such as pitch by performing the heat treatment. However, since the rechargeable lithium battery market has been expanded to ESS and the field of electric vehicles, the development of a high-stability anode active material to be available at a low temperature has been demanded. The demand for development of a high-performance anode active material rather than a method of coating the surface with the low crystalline carbon material has increased. As one of methods for solving this, a study on the anode material through ceramic coating has been conducted.

In addition, in case of the cathode active material, a metal material such as Mn, Fe, Ni, Co, or the like is dissolved to cause deterioration in high temperature performance, such that the performance of the battery may be deteriorated. In order to compensate for this problem, the development of a high-safety cathode active material has been demanded.

The method for preparing the electrode active material according to the exemplary embodiment of the present invention may be performed by, for example, solid phase epitaxy (SPE), wherein the SPE is a method for mixing and compounding a powder using a dry process by applying mechanical energy to the powder of an oxide or a carbonate containing an element of each composition when synthesizing the ceramic powder containing several compositions.

The SPE is deemed more cost-effective than a wet coating method, and has excellent reproducibility, thereby making it possible to perform mass production.

Particularly, the electrode active material prepared according to the exemplary embodiment of the present invention may include the carbon-based active material, the low crystalline carbon material coated on a surface of the carbon-based active material, and the ceramic coated on a surface of the low crystalline carbon material.

The low crystalline carbon material serves as a binding layer such that the active material and the ceramic are more firmly bound as well as allowing the ceramic to be uniformly coated on the surface, such that a state in which the surface of the anode material is generally uniformly coated is maintained. That is, the binding layer is provided such that the phenomenon that the ceramic is coagulated on the edge surface of the active material is prevented to uniformly form the coating layer, thereby making it possible to improve the electrochemical characteristic.

In addition, the ceramic coating layer of the electrode active material prepared by the method for preparing the electrode active material according to the exemplary embodiment of the present invention suppresses the side reaction with the electrolyte generated at the exposed edge surface of the anode material, and reduces the deterioration in battery performance generated due to the problem that the metal material such as Mn, Fe, Ni, Co, or the like is dissolved to cause the deterioration in high temperature performance, thereby making it possible to improve output and cycle life characteristics.

For example, the carbon-based active material may be natural graphite, artificial graphite, soft carbon, hard carbon, or a combination thereof, but is not limited thereto.

The low crystalline carbon material may be petroleum-based pitch, coal-based pitch, mesophase pitch, low molecular heavy oil, polyvinyl alcohol (PVA), polyvinyl chloride (PVC), sucrose, phenol resin, furan resin, furfuryl alcohol, polyacrylonitrile, cellulose, styrene, polyimide, epoxy resin, glucose, or a combination thereof, but is not limited thereto.

The ceramic may be an oxide generated from a metal oxide, a non-metal oxide, a composite metal oxide, a rare-earth oxide, a metal halide, a ceramic precursor, or a combination thereof.

For example, the ceramic may be $SiO_2$, $Al_2O_3$, $Li_4Ti_5O_{12}$, $TiO_2$, $CeO_2$, $ZrO_2$, $BaTiO_3$, $Y_2O_3$, $MgO$, $CuO$, $ZnO$, $AlPO_4$, $AlF$, $Si_3N_4$, $AlN$, $TiN$, $WC$, $SiC$, $TiC$, $MoSi_2$, $Fe_2O_3$, $GeO_2$, $Li_2O$, $MnO$, $NiO$, zeolite, or combination thereof, but is not limited thereto.

The ceramic precursor may be zirconia, aluminum, polycarbosilane, polysiloxane, polysilazane, or a combination thereof, but is not limited thereto.

Meanwhile, the binding layer containing the low crystalline carbon material may be formed by any one of the performing of the first heat treatment or the performing of the second heat treatment.

An average particle size of the carbon-based active material may be 1 to 30 μm.

When the average particle size of the carbon-based active material exists within the range, a stable anode slurry may be prepared at the time of preparing the electrode, thereby preparing a high-density electrode. In addition, in the battery prepared by the method, the cycle life characteristic and the battery safety may be particularly improved.

An average particle size of the ceramic may be 10 to 1000 nm, specifically, 10 to 100 nm.

In the case in which the average particle size of the ceramic exists within the range, uniformity of the ceramic coating may be secured.

A content of the low crystalline carbon material may be 0.1 to 50 parts by weight based on 100 parts by weight of the carbon-based active material, specifically, 1 to 10 parts by weight.

When the content of the low crystalline carbon material exists within the range, the binding layer of the low crystalline carbon material may be effectively formed and the electrochemical characteristic may be controlled.

A content of the ceramic may be 0.1 to 10 parts by weight based on 100 parts by weight of the mixture of the carbon-based active material and the low crystalline carbon material, specifically, 0.5 to 3 parts by weight. When the content of the ceramic exists within the range, coagulation between the ceramic particles may be controlled, thereby making it possible to uniformly coat.

The first mixing and the second mixing may be performed by a mechanical mixing method.

The mechanical mixing method may be a method of mixing by using any one method selected from ball milling, mechanofusion milling, shaker milling, planetary milling, attritor milling, disk milling, shape milling, nauta milling, nobilta milling, high speed mixing, or a combination thereof, but is not limited thereto. The surface energy is generated by mechanical energy. As a result, the mechanical mixing method is used to perform the coating by adhering/fusing interfaces having high surface energy.

That is, in case of mixing the carbon-based active material, the low crystalline carbon material, and the ceramic, the carbon-based active material is physically coupled to the ceramic by the low crystalline carbon material, such that the ceramic may be coated on the surface of the active material by using the low crystalline carbon material as the binding layer.

The first mixing may be performed at 500 to 2500 rpm, specifically, 1000 to 2,300 rpm.

The second mixing may be performed at 800 to 10,000 rpm, specifically, 800 to 2500 rpm.

When the rotational speed at the time of mixing is within the range, the carbon-based active material, the low crystalline carbon material, and the ceramic are coupled to one another, thereby making it possible to uniformly coat.

The heat treatment may be performed under an atmosphere of hydrogen, nitrogen, argon, or a mixture thereof.

The heat treatment may be performed at a temperature of 250 to 1500° C., specifically, 1000 to 1500° C.

When performing the heat treatment in the temperature range, the surface may be coated in a state in which the physical property of the ceramic does not change and the unique property of the ceramic is maintained.

The first heat treatment may be performed at a temperature of 250 to 1500° C.

The second heat treatment may be performed at a temperature of 600 to 3000° C., specifically, 900 to 1500° C.

When the second heat treatment temperature is below 600° C., impurities containing heterogeneous elements may not be effectively removed, and when the second heat treatment temperature exceeds 3000° C., it is difficult to use the heat treatment furnace and mass produce.

According to another preferred embodiment of the present invention, the electrode for the rechargeable lithium battery containing the electrode active material for the rechargeable lithium battery prepared by the above-mentioned method may be provided.

According to yet another preferred embodiment of the present invention, the rechargeable lithium battery including the electrode for the rechargeable lithium battery and the electrolyte may be provided.

The electrode for the rechargeable lithium battery may include the cathode and the anode, and may optionally have a separator disposed between the cathode and the anode.

The rechargeable lithium battery may be classified into a lithium ion battery, a lithium ion polymer battery, and a lithium polymer battery according to a kind of the electrolyte and the separator used therein, it may have a cylindrical shape, a square shape, a coin shape, a pouch shape, or the like, and it may be a bulk type of a thin film type according to a size. Since the structure of battery and the method for preparing the same are well known in the art, the detailed description thereof will be omitted.

The anode includes the current collector and an anode active material layer formed on the current collector, and the anode active material layer includes the anode active material.

The anode active material may be the above-mentioned electrode active material.

The anode active material layer also includes a binder, and may further optionally include a conductive material.

The binder may serve to attach the anode active material particles to each other and attach the anode active material to the current collector. As a typical example, polyvinyl alcohol, carboxy methyl cellulose, hydroxypropyl cellulose, polyvinyl chloride, carboxylated polyvinyl chloride, polyvinylidene fluoride, a polymer containing ethylene oxide, polyvinyl pyrrolidone, polyurethane, polytetrafluoroethylene, polyvinylidene fluoride, polyethylene, polypropylene, polyamide, polyamide imide, styrene-butadiene rubber, acrylated styrene-butadiene rubber, epoxy resin, nylon, or the like may be used, but the binder is not limited thereto.

The conductive material is used in order to give conductivity to the electrode, and may be any material as long as the electronic conductive material does not trigger a chemical change in the battery configured according to the method. For example, a conductive material containing a carbon-based material such as natural graphite, artificial graphite, carbon black, acetylene black, ketjen black, carbon fiber, or the like; a metal-based material such as a metal powder, metal fiber, or the like of copper, nickel, aluminum, silver, or the like; a conductive polymer such as polyphenylene derivatives or the like; or mixtures thereof may be used.

As the current collector, a copper thin film, a nickel thin film, a stainless steel thin film, a titanium thin film, nickel foam, copper foam, a polymer basic material coated with a conductive metal, or a combination thereof may be used.

The cathode includes the current collector and the cathode active material layer formed on the current collector.

As the cathode active material, a compound (lithiated intercalation compound) capable of reversibly intercalating and deintercalating lithium ions may be used. In detail, the cathode active material may be at least one composite oxide formed of a metal such as cobalt, manganese, nickel, aluminum, iron, magnesium, vanadium, or a combination thereof and the lithium, and for example, the above-mentioned electrode active material may be used.

The cathode active material layer includes the binder and the conductive material.

The binder may serve to attach the anode active material particles to each other and attach the anode active material to the current collector. As a typical example, polyvinyl alcohol, carboxy methyl cellulose, hydroxypropyl cellulose, diacetylcellulose, polyvinyl chloride, carboxylated polyvinyl chloride, polyvinylidene fluoride, a polymer containing ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, or the like may be used, but the binder is not limited thereto.

The conductive material is used in order to give conductivity to the electrode, and may be any material as long as the electronic conductive material does not trigger a chemical change in the battery configured according to the method. For example, the metal powder, the metal fiber, or the like such as natural graphite, artificial graphite, carbon black, acetylene black, ketjen black, carbon fiber, copper, nickel, aluminum, silver, or the like may be used. In addition, a mixture of one or more conductive materials such as polyphenylene derivatives or the like may be used.

As the current collector, the aluminum (AL) may be used, but the current collector is not limited thereto.

The active material composition is prepared by mixing the active material, the conductive material, and the binding agent with a solvent, and each of the anode and the cathode is prepared by applying the composition to the current collector. The method for preparing the electrode as described above is well-known to those skilled in the art. Therefore, a detailed description thereof in the specification will be omitted. As the solvent, N-methylpyrrolidone, distilled water, or the like may be used, but the solvent is not limited thereto.

The electrolyte may include a non-aqueous organic solvent and a lithium salt.

The non-aqueous organic solvent serves as a medium capable of moving the ions concerned in the electrochemical reaction of the battery.

As the non-aqueous organic solvent, a carbonate, an ether, an ester, a ketone, an alcohol, or an aprotic solvent may be used.

The non-aqueous organic solvent may be use alone or in a combination of one or more solvents, and a mixing ratio of the solvent in the case in which the mixture of the one or more solvents is used may be appropriately adjusted according to the desired battery performance. The configuration will be widely understood by those skilled in the art.

The lithium salt dissolves in the non-aqueous organic solvent, so it is possible to operate the basic rechargeable lithium battery by it applying as the lithium ion source within the battery. The lithium salt serves to promote the movement of the lithium ions between the cathode and the anode. The lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (herein, x and y are natural numbers), LiCl, LiI, $LiB(C_2O_4)_2$ (lithium bis(oxalato) borate; LiBOB), or combination thereof, as a supporting electrolytic salt.

Referring to FIG. 1, the separator 113 serves to electrically isolate the anode 112 and the cathode 114 from each other and provide a moving path for the lithium ions. Any separator may be used as long as it is generally used in a lithium secondary battery. That is, a separator having excellent wetting performance while having low resistance to ion movement of the electrolyte may be used. For example, the separator may be any one selected from a glass fiber, Teflon, polyethylene, polypropylene, polytetrafluoroethylene (PTFE), and combinations thereof, and may also be a non-woven or woven fabric type. For example, a polyolefin polymer separator such as polyethylene, polypropylene, or the like is mainly used in the lithium ion battery. Further, a separator coated with a ceramic component or a polymer material in order to secure mechanical strength or heat resistance may be optionally used in a single-layer or multi-layer structure.

Hereinafter, examples and comparative examples of the present invention will be described. However, this is only one example of the present invention and the present invention is not limited thereto.

Example 1

(Preparation of an Anode Active Material Composition for a Rechargeable Lithium Battery Natural graphite having an average particle size ($D_{50}$) of 16 μm and petroleum based pitch are mixed at a weight ratio of 100:4.5 using a mechanical mixing method at 2200 rpm for 10 minutes in a high-speed agitator to prepare a uniform mixture.

The uniform mixture and $SiO_2$ having an average particle size ($D_{50}$) of 10 nm are mixed at a weight ratio of 100:1.5 and at 1500 rpm for 10 minutes in a high-speed agitator to prepare a sample.

The sample of Example 1 undergoes a heat treatment at 1100° C. for 5 hours under a nitrogen atmosphere by injecting the prepared sample into a vessel and is sieved in the size of 75 μm to thereby prepare an anode active material composition containing spherical natural graphite coated with the ceramic.
(Preparation of Anode)

The prepared anode active material, styrene-butadiene rubber (SBR) as a binder, and carboxy methyl cellulose (CMC) as a thickener are mixed at a mass ratio of 97:1.5:1.5, and then dispersed in distilled water with ions removed to prepare the anode active material layer composition.

The composition is coated and dried on a cu-foil current collector, followed by pressing to thereby prepare an anode having an electrode density of 1.50±0.05 g/cm³.
(Preparation of a Rechargeable Lithium Battery)

The anode is used as an operation electrode and the metal lithium is used as a counter electrode to prepare a half-cell battery (2032-type coin cell). In this case, a separator made of a porous polypropylene film is inserted between the working electrode and the counter electrode, and an electrolyte solution in which $LiPF_6$ at a 1 M concentration is dissolved in a mixed solution of diethyl carbonate (DEC) and ethylene carbonate (EC) at a mixing volume ratio of 7:3 are used.

Example 2

An anode active material and an anode are prepared by the same method as in Example 1, except that $Al_2O_3$ instead of $SiO_2$ is used to prepare a rechargeable lithium battery.

Example 3

An anode active material and an electrode are prepared by the same method as in Example 1, except that $TiO_2$ instead of $SiO_2$ is used to prepare a rechargeable lithium battery.

Example 4

Natural graphite having an average particle size ($D_{50}$) of 16 μm and petroleum based pitch are mixed at a weight ratio of 100:4.5 using a mechanical mixing method at 2200 rpm for 10 minutes in a high-speed agitator to prepare a uniform mixture.

The mixture of Example 4 undergoes a heat treatment at 1100° C. for 5 hours under a nitrogen atmosphere by injecting the prepared sample into a vessel, and is classified as 75 μm to thereby prepare spherical natural graphite coated with the low crystalline carbon material.

The spherical natural graphite coated with low crystalline carbon material and $TiO_2$ having an average particle size ($D_{50}$) of 50 nm are mixed at a weight ratio of 100:1.5 at 2000 rpm for 20 minutes in a high-speed agitator to prepare a sample.

Comparative Example 1

Natural graphite having an average particle size ($D_{50}$) of 16 μm and petroleum based pitch are mixed at a weight ratio of 100:4.5 using a mechanical mixing method at 2200 rpm for 10 minutes in a high-speed agitator to prepare a uniform mixture.

A heat treatment is performed on the sample at 1100° C. for 5 hours under a nitrogen atmosphere by injecting the uniform mixture into a vessel and is classified as 75 μm to thereby prepare an anode active material composition containing spherical natural graphite coated with the carbon precursor.

An anode is prepared by the same method as in Example 1 except that it uses the anode active material composition to prepare a rechargeable lithium battery.

Evaluation 1: Scanning Electron Microscope (SEM) Photographs

Figure 2:
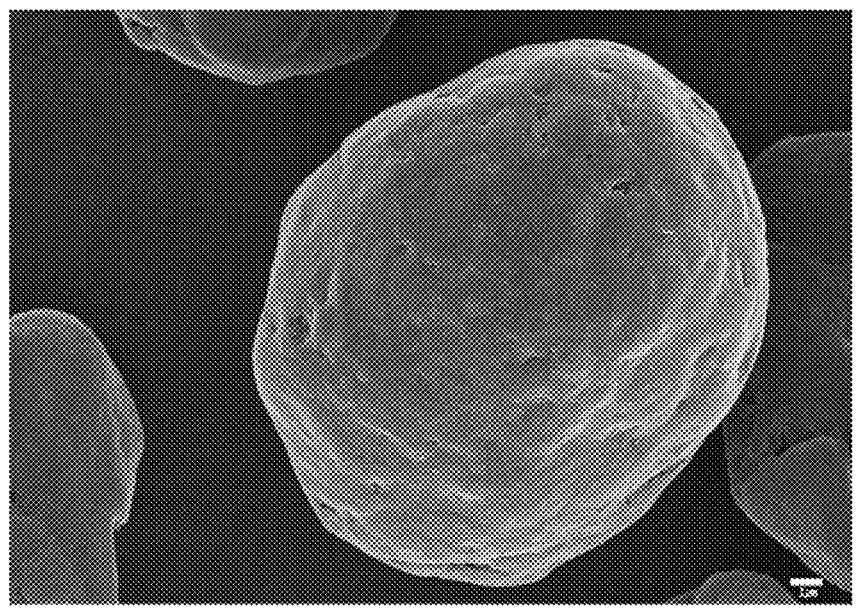
FIG. 2 is a scanning electron microscope (SEM) photograph showing a surface state of an anode active material according to an exemplary embodiment of the present invention.

FIG. 2 is a scanning electron microscope (SEM) photograph showing a surface state of an anode active material according to an exemplary embodiment of the present invention.

Figure 3:
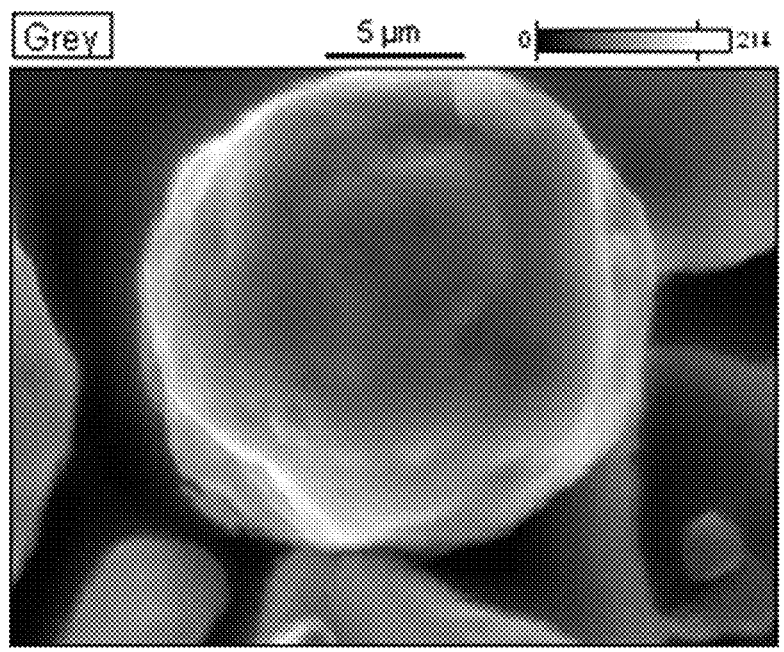
FIG. 3 is a mapping photograph showing a surface state of an anode active material according to an exemplary embodiment of the present invention.

FIG. 3 is a mapping photograph showing a surface state of an anode active material according to an exemplary embodiment of the present invention.

Figure 4:
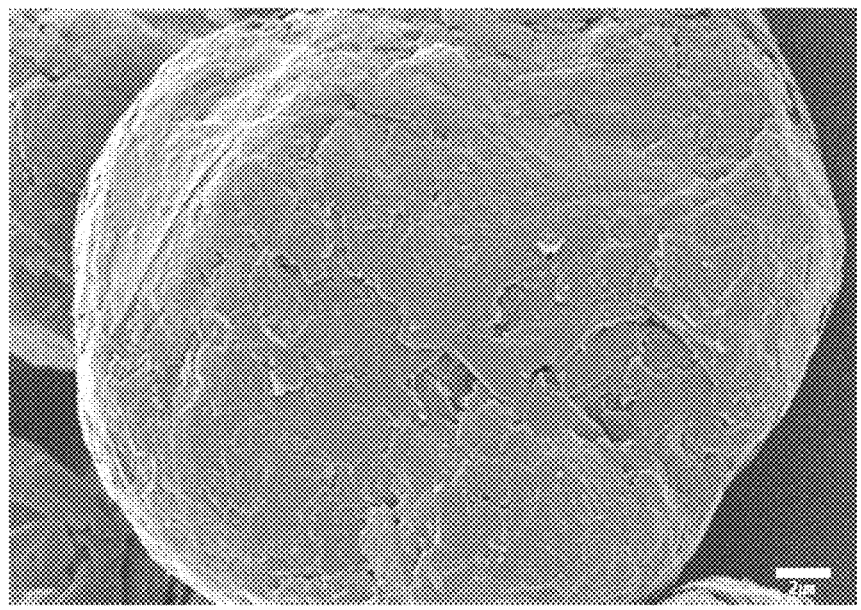
FIG. 4 is a scanning electron microscope (SEM) photograph showing a surface state of an anode active material according to Comparative Example 1.

FIG. 4 is a scanning electron microscope (SEM) photograph showing a surface state of an anode active material according to Comparative Example 1.

Referring to FIGS. 2, 3, and 4, it can be confirmed that the ceramic is uniformly coated in the case of the anode active material according to the exemplary embodiment compared to Comparative Example 1.

Evaluation 2: Evaluation of a High Rate Discharge Characteristic of a Rechargeable Lithium Battery Evaluation 2 evaluates the cycle life characteristic of a rechargeable lithium battery prepared according to Examples 1 to 3 and Comparative Example 1, and the results are shown in Table 1 and FIG. 5.

Figure 5:
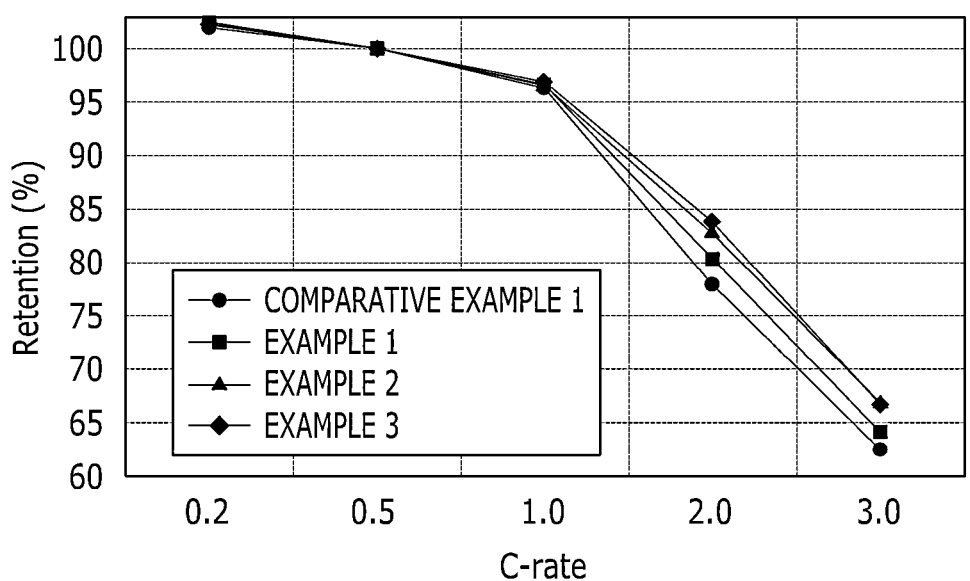
FIG. 5 is a graph showing high rate discharge characteristic of a rechargeable lithium battery according to Examples 1 to 3 and Comparative Example 1.

A constant 70 mA/g current is charged to the rechargeable lithium battery prepared according to Examples 1 to 3 and Comparative Example 1 to terminate the charging at a battery voltage of 0.005 V, and then capacity retention when the battery was discharged to a voltage of 1.5 V at 0.2 C, 0.5 C, 1 C, 2 C, and 3 C with respect to the capacity retention when the battery was discharged to a voltage of 1.5 V at 0.2 C with a 70 mA/g current is maintained, and the results are shown in Table 1 and FIG. 5.

Referring to Table 1, the rechargeable lithium battery according to Examples 1 to 3 have a high rate discharge characteristic that is higher than that of the rechargeable lithium battery according to Comparative Example 1.

TABLE 1

| | C-rate | | | | |
|---|---|---|---|---|---|
| | 0.2 | 0.5 | 1 | 2 | 3 |
| Example 1 | 102.40 | 100.00 | 96.94 | 80.37 | 64.07 |
| Example 2 | 102.38 | 100.00 | 96.51 | 82.81 | 66.84 |
| Example 3 | 102.26 | 100.00 | 96.97 | 83.85 | 66.69 |
| Comparative Example 1 | 102.06 | 100.00 | 96.32 | 77.95 | 62.47 |

Evaluation 3: Evaluation of Cycle Life Characteristic of a Rechargeable Lithium Battery The cycle life characteristics of a rechargeable lithium battery prepared according to Examples 1 to 3 and Comparative Example 1 are evaluated, and the results are shown in Table 2.

The rechargeable lithium batteries prepared according to Examples 1 to 3 and Comparative Example 1 are charged to a voltage of 0.005 V at 0.5 C, and are repeatedly charged and discharged 500 times up to voltage of 1.5 V at 0.5 C to analyze the remaining capacity (%) of the batteries. The analyzed results are shown in the following Table 2. The capacity retention percentage is the percentage of the 450th discharging capacity with respect to initial discharging capacity. Particularly, the 450th discharging capacity with respect to the initial discharging capacity is shown in the Table 2.

Referring to Table 2, the rechargeable lithium batteries according to Examples 1 to 3 have higher capacity retention than the rechargeable lithium battery according to Comparative Example 1 when repeating cycles.

TABLE 2

| | Capacity retention rate % @450 |
|---|---|
| Example 1 | 89.01 |
| Example 2 | 90.05 |
| Example 3 | 91.05 |
| Comparative Example 1 | 88.79 |

The present invention is not limited to the exemplary embodiments, but may be implemented in various different forms. It may be understood by those skilled in the art to which the present invention pertains that the present invention may be implemented in other specific forms without changing the spirit or essential features thereof. Therefore, it should be understood that the above-mentioned embodiments are not restrictive but are exemplary in all aspects.

| <Description of Symbols> | |
|---|---|
| 100: rechargeable lithium battery | 112: anode |
| 113: separator | 114: cathode |
| 120: vessel | 140: sealing member |

What is claimed is:

1. A method for preparing an electrode active material for a rechargeable lithium battery, the method comprising:
    performing first mixing to mix a carbon-based active material with a low crystalline carbon material;
    performing second mixing using a solid phase epitaxy process to mix the mixture of the carbon-based active material and the low crystalline carbon material with a ceramic such that the ceramic is coated on the surface of the electrode active material by using the low crystalline carbon material as a binding layer; and
    performing a heat treatment,
    wherein an average particle size of the ceramic is 10 to 1000 nm.

2. The method of claim 1, wherein the heat treatment is performed after the first mixing.

3. The method of claim 1, wherein the heat treatment is performed after the second mixing.

4. The method of claim 1, wherein the heat treatment comprises a first heat treatment after the first mixing and a second heat treatment after the second mixing.

5. The method of claim 1, wherein the carbon-based active material is natural graphite, artificial graphite, soft carbon, hard carbon, or a combination thereof.

6. The method of claim 1, wherein the low crystalline carbon material is a petroleum-based pitch, a coal-based pitch, a mesophase pitch, a low molecular heavy oil, polyvinyl alcohol (PVA), polyvinyl chloride (PVC), sucrose, a phenol resin, a furan resin, furfuryl alcohol, polyacrylonitrile, cellulose, styrene, a polyimide, an epoxy resin, glucose, or a combination thereof.

7. The method of claim 1, wherein the ceramic is an oxide generated from a metal oxide, a non-metal oxide, a composite metal oxide, a rare-earth oxide, a metal halide, a ceramic precursor, or a combination thereof.

8. The method of claim 7, wherein the ceramic precursor is zirconia, aluminum, polycarbosilane, polysiloxane, polysilazane, or a combination thereof.

9. The method of claim 1, wherein the ceramic is $SiO_2$, $Al_2O_3$, $Li_4Ti_5O_{12}$, $TiO_2$, $CeO_2$, $ZrO_2$, $BaTiO_3$, $Y_2O_3$, $MgO$, $CuO$, $ZnO$, $AlPO_4$, $AlF$, $Si_3N_4$, $AlN$, $TiN$, $WC$, $SiC$, $TiC$, $MoSi_2$, $Fe_2O_3$, $GeO_2$, $Li_2O$, $MnO$, $NiO$, zeolite, or a combination thereof.

10. The method of claim 1, wherein an average particle size of the carbon-based active material is 1 to 30 μm.

11. The method of claim 1, wherein a content of the low crystalline carbon material is 0.1 to 50 parts by weight based on 100 parts by weight of the carbon-based active material.

12. The method of claim 1, wherein a content of the ceramic is 0.1 to 10 parts by weight based on 100 parts by weight of the mixture of the carbon-based active material and the low crystalline carbon material.

13. The method of claim 1, wherein the first mixing is performed by a mechanical mixing method.

14. The method of claim 13, wherein the mechanical mixing method is performed by any one of ball milling, mechanofusion milling, shaker milling, planetary milling, attritor milling, disk milling, shape milling, nauta milling, nobilta milling, high speed mixing, or a combination thereof.

15. The method of claim 1, wherein the first mixing is performed between 500 and 2500 rpm.

16. The method of claim 1, wherein the second mixing is performed between 800 and 10,000 rpm.

17. The method of claim 1, wherein the heat treatment is performed under an atmosphere of hydrogen, nitrogen, argon, or a mixture thereof.

18. The method of claim 1, wherein the heat treatment is performed at a temperature of 250 to 1500° C.

19. The method of claim 4, wherein
    the first heat treatment is performed at a temperature of 250 to 1500° C., and
    the second heat treatment is performed at a temperature of 600 to 3000° C.

20. An electrode for a rechargeable lithium battery comprises an electrode active material for a rechargeable lithium battery prepared by the method of claim 1.

21. A rechargeable lithium battery comprising:
the electrode including the electrode active material of claim 20; and
an electrolyte.

* * * * *